INVENTORS
MOMIR BABUNOVIC
JOHN C. KAY
JEROME F. SHEA
BY Gravely Lieder & Woodruff
ATTORNEYS

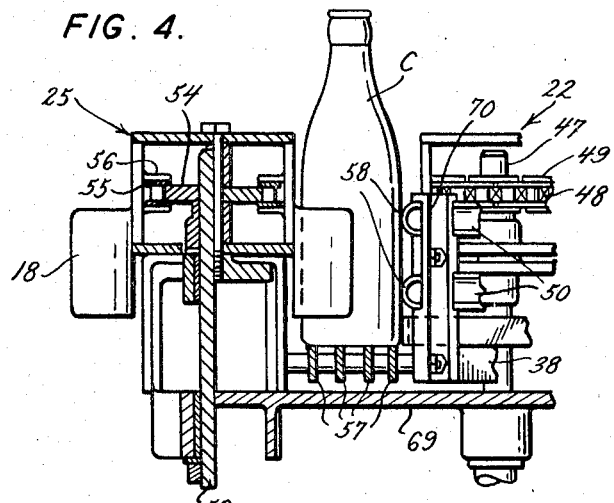
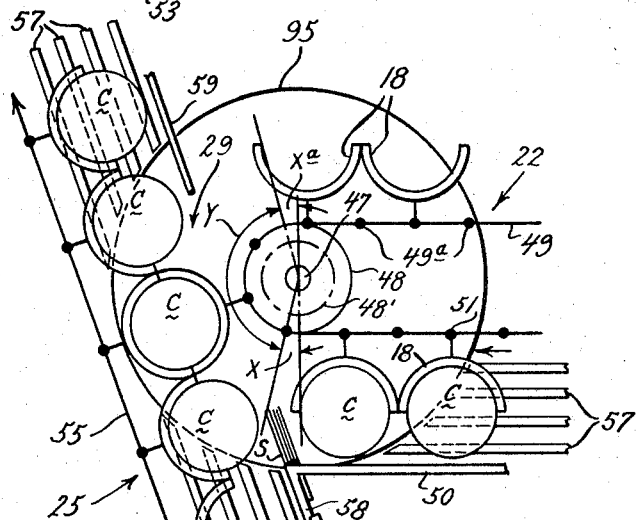
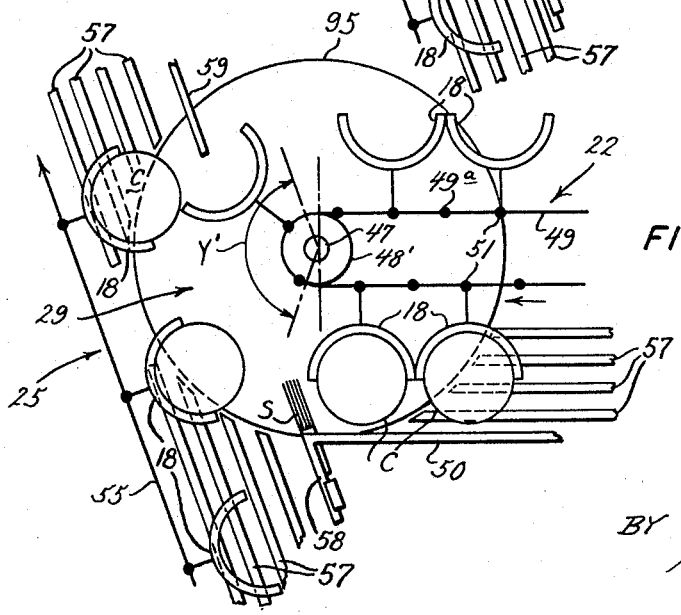

United States Patent Office 3,523,604
Patented Aug. 11, 1970

3,523,604
HIGH-SPEED CONTAINER COMBINER APPARATUS
Momir Babunovic, Des Peres, and John C. Kay, St. Louis, Mo., and Jerome F. Shea, Alton, Ill., assignors to Barry-Wehmiller Company, St. Louis, Mo., a corporation of Missouri
Filed Nov. 27, 1967, Ser. No. 685,838
Int. Cl. B65g 37/00
U.S. Cl. 198—79                    10 Claims

ABSTRACT OF THE DISCLOSURE

A conveyor apparatus for handling containers, such as glass or frangible bottles, at high speeds and to minimize the breakage so that an increased rate of flow can be achieved by combining several sources of low volume capacity into a high-speed flow during transit of containers in a processing plant.

---

This invention relates to improvements in container handling and conveying apparatus, and especially to apparatus that combines glass or frangible containers from several sources into a high-speed flow.

The problem up to now in conveying frangible containers, such as bottles, is overcoming the loss of productive time through breakage jams when the speed of movement reaches a certain upper limit. This problem is widespread throughout the bottle beverage and food industry because the current conveying apparatus handles bottles in bottle-to-bottle contact, or in a crowd flow manner where the bottles are in constant contact and push against each other. The mass movement of bottles generates a momentum factor that works against sudden stoppages or quick changes of flow direction. There is also a problem of transferring bottles from slow to fast conveyors or between a processing machine and conveyors connected thereto.

It is believed that the apparatus to be set forth herein overcomes the problems which have existed up to the present in handling frangible containers such as glass bottles and containers. One of the principal advantages of the present apparatus is that it achieves an improved balance in flow of containers between low capacity and high capacity processing machinery in a given plant. Thus, high capacity machinery is not penalized by low capacity machinery. Other advantages will appear as a preferred embodiment is described.

An important object of this invention is to provide apparatus in which the flow of containers from one or more low capacity high volume machinery or processing equipment can be passed to high-speed conveying apparatus.

Another important object of this invention is to provide means for directing the flow of containers between slow-speed conveyors and high-speed conveyors.

Yet another object of this invention is to provide apparatus to accelerate the lineal speed of articles moved by low-speed conveyors or handling apparatus to the speed of faster conveying apparatus, and to achieve the transfer in a smooth manner between the conveyors without jamming.

It is a further object of this invention to provide an improved arrangement of low-speed conveyors which supply containers to intermediate-speed conveyors and thence to high-speed conveyor means.

A further object of this invention is to provide apparatus to transfer frangible articles between different speed conveyors such that contact between articles is avoided.

Yet another object of this invention is to provide improved apparatus for effecting the smooth transfer of articles, glass containers, and the like from a low speed conveyor to a higher speed conveyor at a zone where the low-speed conveyor can achieve an acceleration of the articles to substantially match the lineal speed of the higher speed conveyor.

Still a further object of this invention is to relate low-speed and higher speed article conveyors in such an angular relation that the discharge end of the low-speed conveyor imparts a circumferential acceleration to the articles which substantially matches the lineal speed of the higher speed conveyor and achieves a smooth transfer of the articles.

Further objects and additional advantages of the present invention will be described in connection with a preferred embodiment of apparatus which has been illustrated in the accompanying drawings, wherein:

FIG. 4 is another fragmentary sectional elevational view taken at line 4—4 in FIG. 2; the view also being typical of the assembly of other portions thereof;

FIG. 5 is a schematic perspective view of the arrangement of means for furnishing power to the conveyors making up the apparatus of FIG. 1;

FIG. 6 is a schematic diagram of a feeder conveyor and a collector conveyor to illustrate the principle of the invention; and FIG. 7 is a view similar to FIG. 6, but showing the effect when the conveyor sprocket is changed in size on the transfer of containers.

Figure 1:
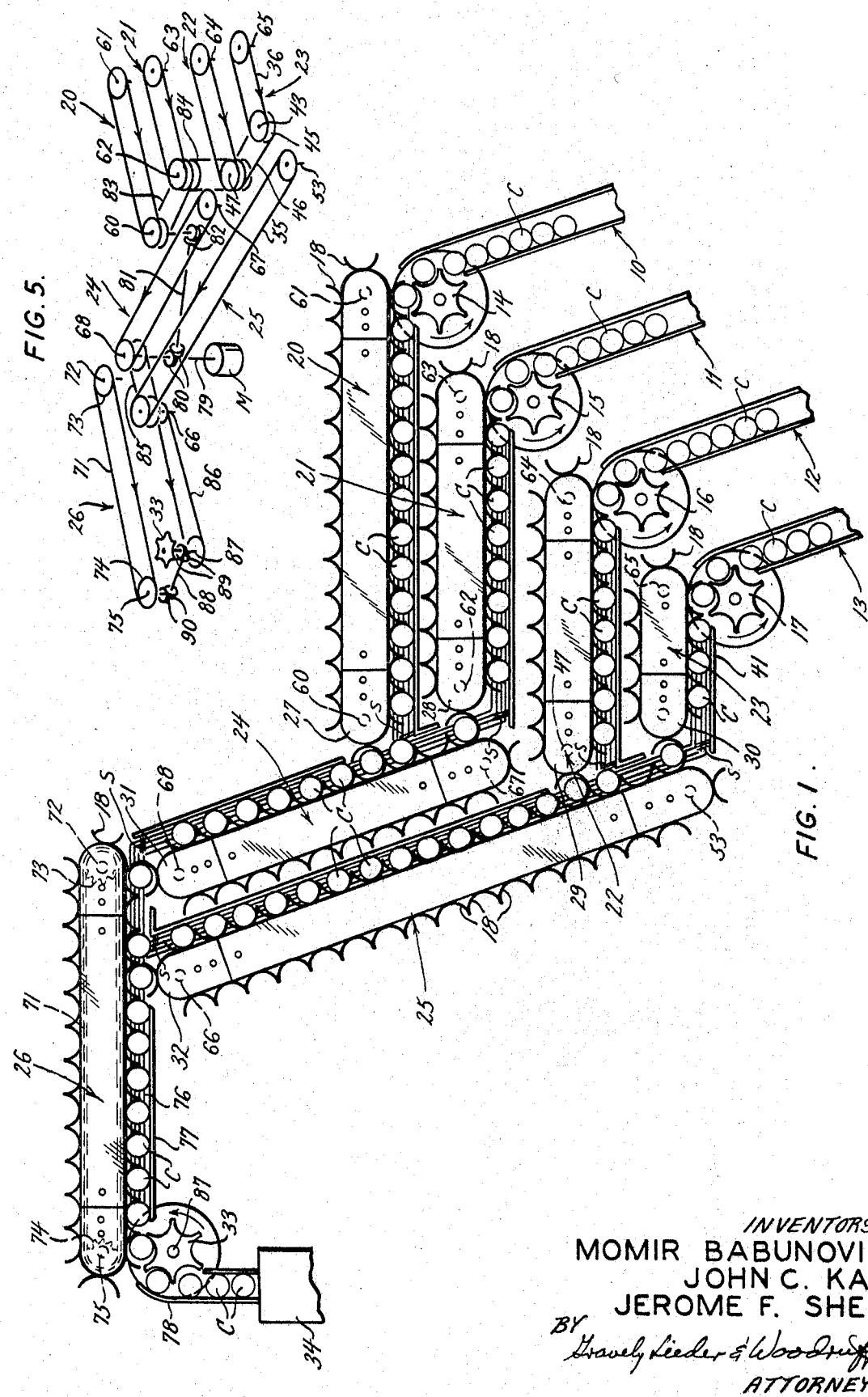
FIG. 1 is a schematic and fragmentary plan view of an organization of conveyors capable of achieving the enumerated and other objects of the present invention.

In the preferred embodiment of the present apparatus a plurality of conveyors are oragnized such that slow-speed feeder conveyors bring containers into transfer relation with intermediate-speed collector conveyors and the latter conveyors feed the containers to a high-speed collector conveyor. The slower feed conveyors have transfer zones formed by sprockets where the containers are moved in a circular path such that the change from lineal motion to circumferential motion results in an increase of velocity over the lineal velocity. The several conveyors are provided with container carriers whereby the containers are maintained separate from each other. As the carriers reach the transfer zone the circular travel accelerates the containers to match the lineal speed of the carriers arriving at the transfer zone. A smooth transfer of the containers from the carriers or pocketed members of the slower speed conveyors to similar carriers in the intermediate-speed conveyors, so as to avoid carrier and container interference is obtained by directing the slower speed conveyor axes at a predetermined desired direction to the axes of the intermediate-speed conveyors. The same organization of intermediate-speed and high-speed conveyors is arranged so that the second transfer of containers is smoothly achieved without interfering contact of carriers or the containers therein.

Applying the above principle to a conveyor system, it can be appreciated that each of a pair of slow-speed conveyors can feed containers to transfer zones for collection in the carriers of an intermediate-speed conveyor so that the latter carriers are filled. The intermediate conveyor also is provided with a transfer zone where the lineal speed is accelerated relative to the lineal speed of approach thereto. The intermediate-speed conveyor is made to feed containers into the carriers of a high-speed conveyor. Thus, for example, four slow-speed feed conveyors can supply containers for collection in a pair of intermediate-speed conveyors, and the containers may be fed to a pair of intermediate-speed collector conveyors to transfer containers into alternate carriers of a high-speed conveyor. In this manner there is obtained a smooth flow of containers having a final speed considerably greater than the speed of the slow-speed conveyors. As a consequence of this progressive acceleration of containers it is entirely possible to combine and feed the flow of containers from a group of slow-speed conveyors, say of a capacity of 400 containers per minute, to a high-speed conveyor having a capacity of 600 containers per minute. It can now be seen that by selecting the proper size of container carrier and conveyor speed a variety of conveyor arrangements and speeds can be organized to combine and build up the speed of travel of containers to meet the operation of high-speed processing machinery. Of course, the arrangement of transfer zones between feeder and collector conveyors is a function of the size of containers and carriers and the circumferential velocities at the transfer zones, and these factors can be altered according to the final volume of container flow.

Referring now to FIG. 1 there is shown a schematic layout of a conveyor organization in which a plurality of low-speed supply conveyors 10, 11, 12 and 13 bring containers C up to respective timing starwheels 14, 15, 16 and 17 where the pockets in the starwheels isolate the individual containers and condition the containers to be picked up by suitable pocketed members or carriers 18 which are propelled by the low-speed feeder conveyors 20, 21, 22 and 23 toward a pair of intermediate-speed collector conveyors 24 and 25. In like manner the intermediate conveyors have carrier members 18 for maintaining the containers isolated from each other. The intermediate-speed conveyors are arranged to feed a final high-speed collector conveyor 26. In the arrangement shown it is observed that the low-speed conveyors 20 and 21 have transfer zones 27 and 28 respectively which are arranged to deliver the containers C to alternate carriers 18 moved by the intermediate-speed conveyor 24. This develops a smooth transition of the containers C from the conveyors 20 and 21 into the alternate carriers 18 moved by the intermediate-speed collector conveyor 24. In a similar manner low-speed feeder conveyors 22 and 23 have transfer zones 29 and 30 which are adapted to bring the containers C into transfer relation with alternate carriers 18 of the intermediate-speed collector conveyor 25. In this manner a plurality of low-speed feeder conveyors is arranged to feed a lesser number of intermediate-speed collector conveyors and in like manner the transfer zones 31 and 32 of the intermediate-speed collector conveyors 24 and 25 respectively are adapted to feed alternate carriers 18 of a final high-speed collector conveyor 26. The high-speed conveyor 26 will then conduct the containers C to a timing starwheel 33 where the containers are appropriately directed into any of a number of processing machinery, such as is shown in fragmentary part at 34.

Figure 2:
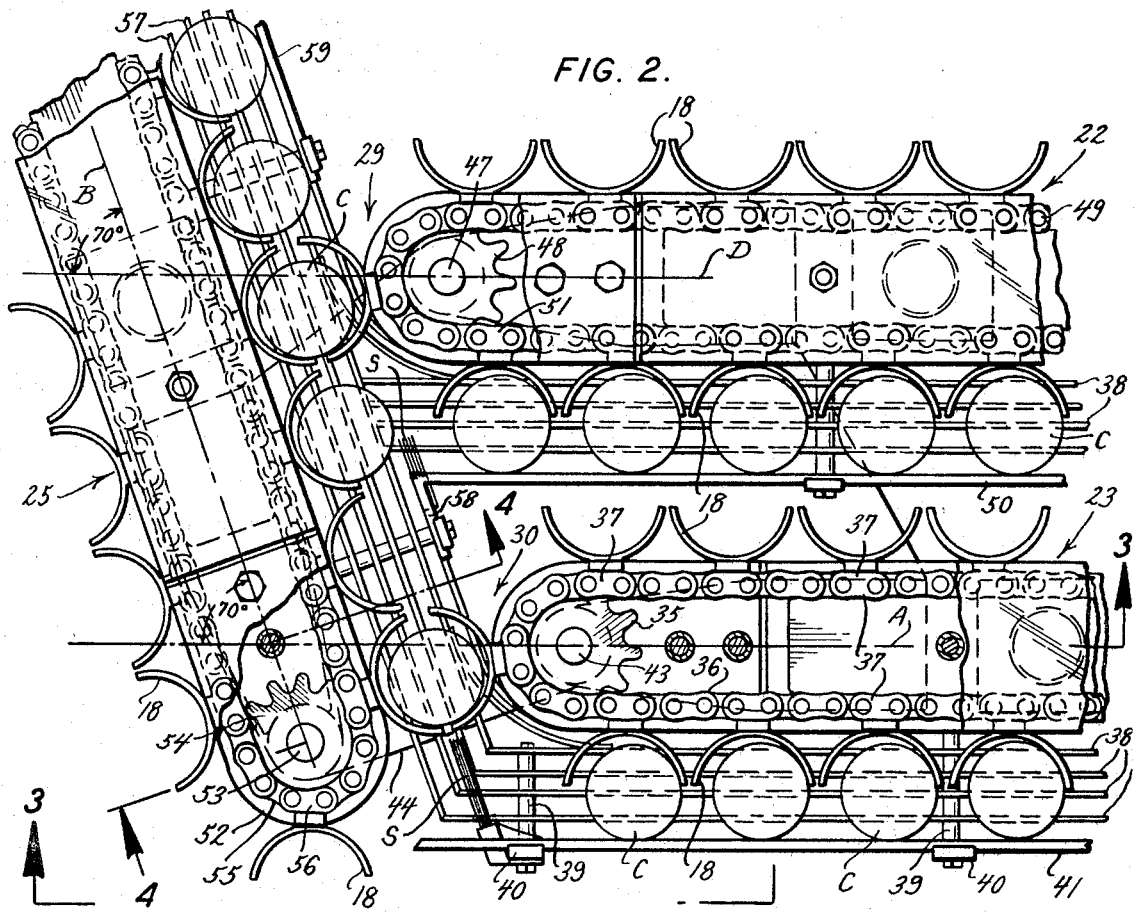
FIG. 2 is a greatly enlarged and fragmentary portion of the conveyor organization shown in FIG. 1.
Figure 3:
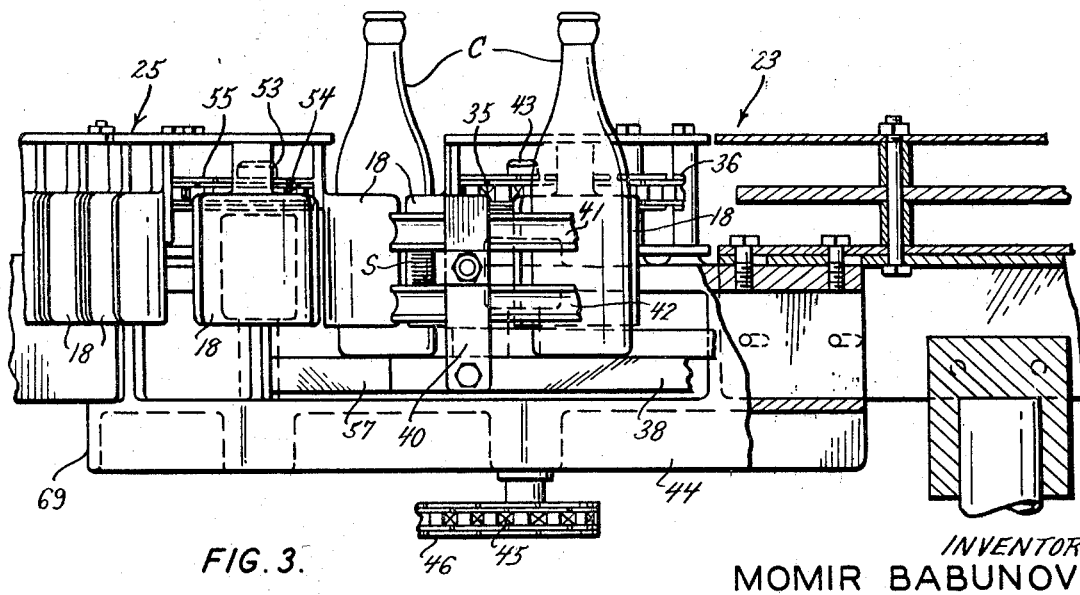
FIG. 3 is a fragmentary sectional elevational view of the apparatus as seen along line 3—3 in FIG. 2, the view being typical of the assembly of other portions thereof.

Reference will now be made to FIGS. 2 and 3 where typical details of the conveyor system shown in FIG. 1 will now be described. More particularly, FIG. 2 is a greatly enlarged fragmentary planned view of portions of the low-speed feeder conveyors 22 and 23 having the tarnsfer zones 29 and 30 respectively arranged to feed containers into the carriers 18 on the intermediate collector conveyor 25. As is shown for conveyor 23 the transfer zone 30 has a sprocket 35 for directing a roller chain 36 around a circumferential transfer zone 30 such that linear speed of the chain 36 is converted into angular speed by the sprocket 35. Alternate links 37 in the roller chain 36 support the container carriers 18, each carrier being a semi-cylindrical pocket member having a suitable size to accommodate up to the largest of a variety of sizes of containers. The carriers 18 propel the containers C along a support path defined by a plurality of grid bars 38 which are suitably supported at intervals on brackets 39. The brackets 39 have vertical uprights 40 in the outer ends to support a system of side rails 41 and 42 which cooperate with the carriers 18 to confine the containers C throughout the travel along the length of conveyor 23. Each of the conveyors 20, 21 and 22 have a similar arrangement of container supporting grid bars 38, brackets 39 and guide rails 41 and 42 as is seen in FIGS. 2 and 3 for the conveyor 23. The sprocket 35 for conveyor 23 is suitably mounted on a vertical drive shaft 43 which is bearinged in a frame shown generally at 44 such that a drive sprocket 45 below the frame 44 may be engaged by a sprocket chain 46. It is not believed necessary to provide a detailed description of other structures which would, of course, be normally provided and is therefore well understood by those skilled in this art.

Still referring to FIG. 2, the conveyor 22 is provided with a drive shaft 47 at the transfer zone 29, and the shaft 47 supports a suitable sprocket wheel 48 which converts linear motion of the roller chain 49 into angular motion such that the container carriers 18 in traversing the transfer zone 29 will be accelerated to match the linear speed of travel of the carriers 18 in the conveyor 25. The conveyors 22 and 23 are so located that the transfer of containers takes place during the linear travel of the carriers 18 in the conveyor 25. Conveyor 22 also is provided with grid bars 38 which supports the containers and there is a suitable guide rail 50 which cooperates with the carriers 18 for controlling the movement of the containers C. The carriers 18 are attached to alternate links 51 on the roller chain 49 which engage the sprocket 48.

There is also schematically shown in FIG. 2 a terminal end 52 of the conveyor 25. The terminal end is partially defined by a drive shaft 53 for supporting a suitable roller chain sprocket 54 that engages a suitable sprocket chain 55 in which alternate links 56 support the respective carriers 18. As will be observed, the containers C on being conveyed passed the transfer zones 29 and 30 of the respective conveyors 22 and 23 are supported on a suitable system of grid bars 57, and as the container transfer occurs from the transfer zone 30 of conveyor 23 the container is momentarily confined by a suitable short length fence 58. As the containers eventually leave the vicinity of transfer zone 29 of conveyor 22 they are moved into confinement on the grid bars 57 by a suitable fence 59.

As may be seen in FIG. 2, container stabilizer means S are provided at the respective transfer zones 29 and 30 where the containers C are being accelerated into a circumferential path and before the arriving carriers 18 on conveyor 25 are in position to close with the feeding carriers 18. The stabilizer means S are mounted close to the rails 41 and 42, and rails 58, respectively, so as to be engaged by the containers. The means S act to support the containers and prevent forward toppling motion should there be any hitches in the movement of the conveyor system.

What has been described in connection with FIGS. 2 and 3 is considered to be typical for the conveyors 20, 21, 22 and 23. Accordingly, no detailed description will be provided for the conveyors 20 and 21 except to point out that the transfer zone 27 for conveyor 20 is provided with a roller chain sprocket drive shaft 60 and the opposite end is constituted by a similar sprocket on an idler shaft 61. In the conveyor 21 the transfer zone 28 may be defined by an idler shaft 63. The conveyor 22 has already been described as having a drive shaft 47 at its terminal end 29. Therefore, the opposite end of the conveyor is depicted at an idler shaft 64. In like manner the conveyor 30 has its drive shaft 43 at one end and the opposite end is depicted by the idler shaft 65. In a similar manner the intermediate-speed conveyor 25 has its idler shaft 53 adjacent the tranfer zone 30 for the conveyor 23 while the opposite end is provided with a drive shaft 66 for the proper support of a suitable sprocket wheel (not shown) that defines the transfer zone 32 of this conveyor. The intermediate-speed conveyor 24 is similarly provided with an idler shaft 67 adjacent the transfer zone 28 for the low-speed conveyor 21, while the opposite end is provided with a drive shaft 68 having a sprocket wheel (not shown) defining the transfer zone 31 thereof.

As can be seen in FIG. 4, the carriers 18 are attached to roller chain 55 by links 56 and these links are supported on the sprocket wheel 54 which in turn is operably mounted on a shaft 53. Since the shaft 53 is an idler shaft there is merely the usual supporting bearing assembly carried in the conveyor frame 69. There was indicated in FIG. 2 a fence 58 which, as shown in FIG. 4, consists in a vertical bracket 70 supporting the fence elements 58. FIG. 4 also shows the grid bars 57 which support the containers in sliding position.

In FIG. 1 the high-speed conveyor 26 has its carriers 18 attached to a roller chain 71 which passes around a shaft 72 carrying a suitable idler sprocket 73, and also a drive sprocket 74 mounted on a shaft 75. The containers C are fed from the respective transfer zones 31 and 32 of the conveyors 24 and 25 into the carrier 18 on the conveyor 26. They are supported by a suitable arrangement of grid bars 76 and a fence 77 of the type generally shown in FIG. 3 or 4. The containers move along the length of the conveyor 26 until they reach the starwheel 33 where a transfer occurs aided by a conveying fence 78 that cooperates with the starwheel 33. The containers in this transition point may be supported on a suitable rotary plate or by a system of stationary grid bars of the type already disclosed.

Referring now to FIG. 5 it will be observed that a schematic drive system shown includes a suitable prime mover M having its shaft 79 arranged in driving connection with shaft 68 for the conveyor 24. The shaft 79 is also provided with a set of bevel gears 80 for driving shaft 81 that connects with a second bevel gear set 82 operably connected to the shaft 60 for conveyor 20. The shaft 60 supports a drive sprocket for supplying power to the sprocket chain 83 and this transfers power to the shaft 62 for conveyor 21. In like manner a drive sprocket chain 84 is operably connected to drive shaft 47 for the conveyor 22, while the sprocket chain 46 is connected to drive shaft 43 of conveyor 23. The opposite ends of the respective conveyors 20, 21, 22 and 23 are depicted by respective idler shafts 61, 62, 63, 64 and 65. There is also shown in FIG. 5 a sprocket chain drive take-off 85 from the shaft 68 to the shaft 66 for the delivery end 32 of the conveyor 25. The opposite end of this conveyor, defined by shaft 53, is an idler end. There is a sprocket drive take-off 86 from the lower end of shaft 66 to the shaft 87 which drives the starwheel 33 adjacent the discharge end of the conveyor 26. The shaft 87 drives a power take-off shaft 88 through a bevel gear set 89, and the shaft 88 through a second bevel gear set 90 drives the shaft 75 which actuates the conveyor 26. It is appreciated that no attempt is made in FIG. 5 to show the various gear ratios or drive pulley sizes as no limitations of this character is intended.

A particular feature of this invention which is believed unique is best shown in FIG. 2 where it is observed that the longitudinal axis A of conveyor 23 has an angle of approach relative to the longitudinal axis B of conveyor 25 of the order of approximately 70°. In like manner the longitudinal axis D of conveyor 22 approaches the axis B for conveyor 25 at approximately an angle of 70° as obtains between axes A and B. It is also noted that the transfer zones 29 and 30 respectively of the conveyors 22 and 23 effectively discharge the containers C into the carriers 18 for collector conveyor 25 at zones where the carriers 18 are moving in a linear direction and at the linear speed of the conveyor. Thus, by proper selection of the size (diameter) of sprockets 35 and 48 for the conveyors 22 and 23 respectively and also by properly selecting the speed of rotation of the drive shaft 43 and 47 for the latter conveyors and shaft 66 for the collector conveyor 25 a substantially precise relationship can be obtained between the carriers 18 on the conveyors 22 and 23 and the carriers 18 on the conveyor 25, while the carriers 18 on the feeder conveyors 22 and 23 are traversing a circular path. Matching the circumferential speed of the feeder carriers 18 with the linear speed of travel of the collector carriers 18 on the conveyor 25 will thus result in a smooth transfer of the containers. During the precise interval of transfer of the containers it can be seen in FIG. 2 that the matching carriers 18 substantially confine each container so that there can be no escape or jamming of the containers during this critical period. Just prior to the respective carriers reaching the matched positions, the stabilizing means S comes into play to control the containers so that centrifugal force during acceleration will not cause the containers to topple or pitch forward, since at this point of the transfer zone the containers are not fully confined by the carriers and the guide rails, or by the matched positioning of the carriers. It has been pointed out above that the conveyors 22 and 23 are adapted to transfer containers to alternate carriers 18 of the conveyor 25, and this transfer relation is best seen in FIG. 2. The transfer relationship also is typical of other transfer points in the conveyor system of FIG. 1.

Having now described a preferred embodiment of the present invention it can be appreciated that the low-speed conveyors 20, 21, 22 and 23 may be operated so as to feed containers into the respective transfer zones 27, 28, 29 and 30 at a preselected rate of containers per minute. This will then determine the speed at which the intermediate-speed collector conveyors 24 and 25 must operate in order to obtain a smooth transfer. In like manner the conveyors 24 and 25 will feed containers to the transfer zones 31 and 32 at a predetermined higher rate than for the low-speed conveyors. Thus, the high-speed collector conveyor 26 must be given a suitable linear speed in order to effect the smooth transfer and conveyance of the containers C away from the transfer zones 31 and 32 of the intermediate-speed conveyors. The various necessary speeds for the groups of conveyors can be properly obtained and held constant by means of the drive system depicted in FIG. 5. This is important because if there is any change in speed of one conveyor there must be a corresponding and matching speed change for all of the other conveyors. In the system shown in FIG. 5 the prime mover M is positively connected to all of the conveyor drive shafts so that any variation in speed will be immediately reflected throughout the conveyor system.

Looking now at FIG. 6 it can be seen that the feeder conveyor 22 has carriers 18 connected to every other roller chain link, as represented by the points 49a on the pitch line of the chain 49. The carriers 18 approach the sprocket 48 and are caused to follow a curved path (as depicted by the pitch line) in which each carrier is speeded up from the lineal velocity of approach to the circumferential velocity (or angular velocity). The change in velocity occurs in the angular interval X and is reversed in the angular interval Xa. Between the velocity change intervals, the carrier has a substantially constant circumferential velocity in the angular interval represented by the broken arc line Y. The transfer of containers may take place at any zone in the span of the arc Y, but it is preferred to arrange the transfer early in the span of the arc so as to take advantage of the low angle of tangency between the line of travel of conveyor 22 and the line of travel of conveyor 25.

Should a change in velocity of the containers be necessary or desirable it is achieved in a number of ways. One way is shown in FIG. 7 where the roller chain 49 is caused to traverse a smaller diameter sprocket 48' as represented by the pitch line. No change in the chain pitch of conveyor 22 is made and the shaft 47 is run at the same r.p.m. as for the example in FIG. 6. With these conditions in mind, it can be seen that each carrier 18 as it reaches the angular interval Y' must travel a longer angular distance in the same amount of time; hence its velocity is higher than for each carrier in FIG. 6. If no velocity change is made for conveyor 25, then container transfer can take place only if the r.p.m. of shaft 47 is reduced, and this means decreasing the capacity of the conveyor 22.

Returning to FIG. 6, there is superimposed on sprocket 48 the pitch line for the sprocket 48' of FIG. 7. This comparison shows that for a smaller sprocket to maintain the same carrier velocity along the pitch line for sprocket 48 it is necessary to reduce the pitch of the conveyor chain 49 and also to mount the carriers on brackets that will allow the carriers to traverse the pitch line of the larger sprocket 48. In other words, the brackets must be lengthened by the difference in the radii of the sprocket pitch circles 48 and 48'.

Whatever changes are made in the pitch of the feeder conveyor chains, or the size of the transfer sprockets, that will affect the speed of the containers along the circumferential or curved path or the number of containers fed thereto in unit time, will also affect the operation of the associated collector conveyor because carrier matching is important.

FIGS. 6 and 7 illustrate also an alternate provision for supporting the containers in the respective transfer zones of the system. The shaft 47 carries, in these views, a rotary disc or table 95 for supporting the bottoms of the containers during the transfer. The disc 95 will have a speed in excess of the linear speed of the chain 49 so that for a small angular travel the disc 95 will slide under the containers, but this occurs in the zone where the means S is located to stabilize the upright attitude of the containers.

There has been described above an improved conveyor apparatus for effecting the combining of a flow of containers so as to progressively increase the number of containers that may be moved in a unit of time or in a predetermined distance. Certain preferred apparatus has been disclosed and described in the foregoing specification for the purpose of teaching the principles that are involved in the operation of the apparatus. In addition, it is to be understood that the present invention includes a novel method of accelerating the movement of containers between a source of supply and a discharge zone or a zone where processing apparatus receives the flow of containers.

The process apparatus referred to herein may comprise any of the present high-speed container fillers where the containers are fed tangentially or at some suitable chordal angle to the circular path defned by the filling machine. It is known that rotary fillers can move at a substantial velocity and thereby make such apparatus an important receiver or collector for the output of the improved high-speed conveyor apparatus of this invention. For example, the conveyor 26 of FIG. 1 can be considered in the form of a rotary filler apparatus so that the conveyors 24 and 25 will deliver containers to every other pocket or carrier at a speed coordinated with the substituted filler apparatus. In this way the present invention can be easily adapted to supply any of the high-speed apparatus commercially available.

In referring to accelerating the moving of containers, it is intended to include a speed-up from a lower velocity to a higher velocity through a momentary or limited zone of acceleration which obviously involves a change in velocity per unit of time. A preferred method of this invention includes the steps of advancing or moving containers along a predetermined lineal path toward a zone where a change in the direction of movement of containers occurs from lineal to non-lineal, thereby increasing the velocity while decreasing the rate of advancement of the containers in the former direction of the predetermined path, and transferring the containers to other means which will then advance the containers in a different direction along a lineal path. The transfer of the containers makes use of the effect of centrifugal force to cause the containers during the non-lineal movement to go from the non-lineal path to the other means for advancing the containers. In order to make the method effective the advance of containers along the second lineal path must be substantially the increased velocity which is attained during the change in movement from lineal to non-lineal. It is evident from an inspection of FIGS. 6 and 7 that changes can be made in the apparatus which puts into practice the method above described.

The foregoing description and drawings relate to a preferred embodiment of the present invention, but it is understood that changes and modifications which occur to those skilled in the art after reading the foregoing are intended to be included within the spirit and scope of the disclosure.

What is claimed is:

1. Container conveyor apparatus for transferring containers between a pair of conveyors with the containers in vertically upright positions, said apparatus including: a first horizontally movable endless conveyor; a terminal sprocket means about which said endless conveyor moves in a curved path; container carriers projecting outwardly from said endless conveyor and being moved about the periphery of said sprocket means on a larger curved path than is followed by said conveyor moving about said sprocket means, said carriers at the periphery of said sprocket means having a velocity greater than the velocity of said carriers on either side of said sprocket means; a second conveyor movable in a path directed tangentially adjacent the curved path followed by said carrier means at the periphery of said sprocket means; other container carriers on and projecting laterally outwardly from said second conveyor; and powered means operably connected to said first and second conveyors to drive said second conveyor and said other carriers at substantially the velocity of said container carriers on said first conveyor traversing the curved path about said sprocket means, whereby said carrier means are brought into coincidence for transferring containers.

2. The container combining conveyor apparatus of claim 1 wherein stabilizer means is disposed in the path of movement of said carrier means of said first conveyor in advance of coinciding with said carrier means of said second conveyor.

3. The container combining conveyor apparatus of claim 1 wherein said carrier means on each conveyor comprise pocketed members at least partially surrounding the individual containers, and guard rail means adjacent said conveyor pocketed members retain the containers within the pocketed members, said guard rail means being interrupted at said terminal end of said first conveyor where said carrier means substantially match up.

4. The container combining conveyor apparatus of claim 1 wherein grid means extends adjacent each conveyor to support the containers in said carrier means, said grid means for said first conveyor having ends adjacent said grid means for said second conveyor, said grid means being in substantially the same plane.

5. In container conveyor apparatus the improvement of a plurality of axially elongated feeder conveyor means for receiving and moving containers in single file order between receiving and discharge zones, said feeder conveyor means being arranged in pairs and the discharge zones being circular, axially elongated collector conveyor means for each pair of said feeder conveyor means, said collector conveyor means each having linearly directed receiving zones and circular discharge zones, the linear receiving zones of said collector conveyor means being located tangentially adjacent said circular discharge zones of a pair of said feeder conveyor means, axially elongated container receiving conveyor means directed tangentially adjacent said circular discharge zones of said collector conveyor means, container carrier means on and projecting laterally outwardly relative to the path followed by each of said conveyor means, said carrier means maintaining the containers in vertically erect and non-contacting relationship, and prime mover means operably connected to all of said conveyor means to drive said conveyor means at different velocities, said projecting carrier means traversing a larger circular path at said circular discharge zones of said feeder and collector conveyor means to transfer the containers at velocities matching the velocities of said tangentially directed conveyor means to which the containers are transferred.

6. The container combining conveyor apparatus of claim 5 wherein said prime mover means drives said collector conveyor means faster than the lineal velocity of said feeder conveyor means and drives said axially elongated container receiving conveyor means faster than the lineal velocity of said collector conveyor means, the movement of said carrier means at said discharge zones being non-lineal and substantially matching the velocity of the adjacent conveyor means.

7. A method of accelerating the movement of containers between a source of supply and a discharge zone, the method including the steps of first advancing the containers along a predetermined linear path, then uninterruptedly changing the direction of movement of the containers from said predetermined linear path to a non-linear path to increase the velocity while decreasing the advancement of the containers in the direction of the predetermined path, transferring the containers out of the non-linear path to other means for subsequently advancing the containers in a linear path substantially tangent to said non-linear path and in a direction of movement substantially following the non-linear path adjacent the point of transfer, and advancing the containers along said second path at substantially the increased velocity.

8. A method of combining the flow of containers from feeder conveyors through collector conveyors to a final conveyor which includes the steps of merging the containers in the same direction of movement from the feeder conveyors into the collector conveyors and merging the containers from the collector conveyors into the final conveyor in the same direction of movement in transfer zones in which the containers to be merged are initially traveling in a non-linear path, and actuating said feeder and collector conveyors at differential velocities such that the collector conveyors have velocities substantially matching the velocity of the containers flowing in the non-lineal path of the feeder conveyors and the final conveyor has a velocity substantially matching the velocity of the containers flowing in the non-lineal path of the collector conveyors.

9. The method of claim 8 in which the non-lineal path traversed by the containers in the respective transfer zones between the conveyors is substantially constant, and the transfer is effected during a time when the velocities of the containers in said circular paths are substantially constant.

10. Container conveying apparatus comprising a pair of first endless conveyors, pockets on each first conveyors adapted to move containers in upright and separated positions, each said first conveyors having a circular discharge end in which said pockets move about the periphery of said circular discharge end, a second conveyor having a portion movable in a path adjacent to both of said first conveyor discharge ends, pockets on said second conveyor movable into substantial registration with alternate ones of said pockets of said first conveyors, and means connected to said first and second conveyors to drive said conveyors such that said pockets move together at the instant of substantial registration and in the same directions at such instant.

References Cited

UNITED STATES PATENTS 3,088,573   5/1963   Tkacs _____ 198—20

FOREIGN PATENTS 568,518   11/1957   Italy.

RICHARD E. AEGERTER, Primary Examiner

U.S. Cl. X.R.

198—32